Figure 1:
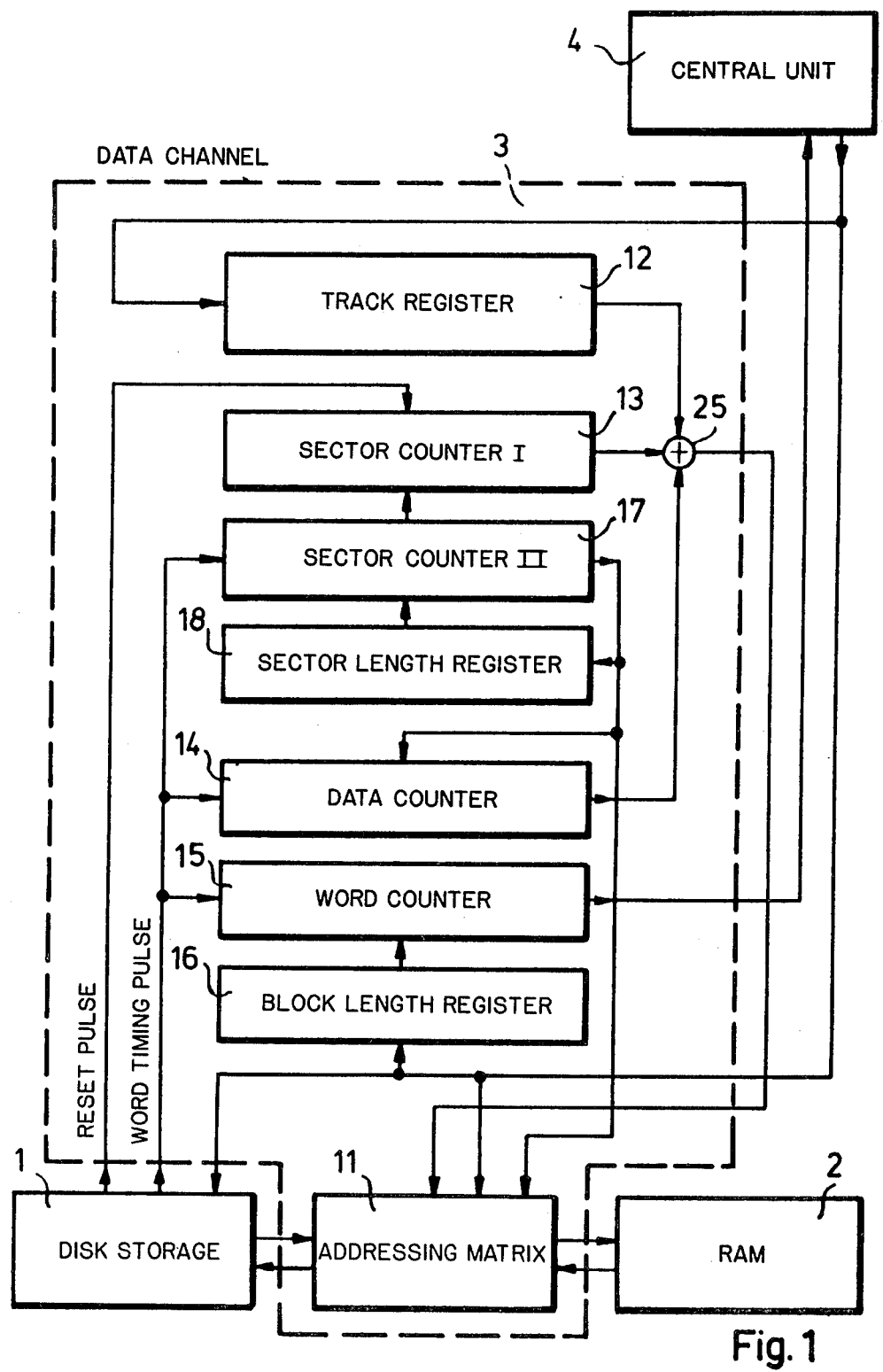

United States Patent [19]

Schneider et al.

[11] 4,456,933
[45] Jun. 26, 1984

[54] TRANSFERRING DATA BETWEEN MEMORY AND MAGNETIC STORAGE

[75] Inventors: Lutz Schneider, Malsch-Völkersbach; Bruno Guigas, Bruchsal, both of Fed. Rep. of Germany

[73] Assignee: Bruker Analytische Messtechnik GmbH, Rheinstetten-Forchheim, Fed. Rep. of Germany

[21] Appl. No.: 329,737

[22] Filed: Dec. 11, 1981

[30] Foreign Application Priority Data

Dec. 17, 1980 [DE] Fed. Rep. of Germany ....... 3047506

[51] Int. Cl.³ .............................................. G11B 5/09
[52] U.S. Cl. ...................................... 360/49; 360/40
[58] Field of Search ....................... 360/39, 40, 49, 50, 360/72.2

[56] References Cited

U.S. PATENT DOCUMENTS 4,241,420  12/1980  Fish et al. ............................. 360/50
4,366,512  12/1982  Jawak et al. ......................... 360/50

Primary Examiner—Vincent P. Canney
Attorney, Agent, or Firm—Burmeister, York, Palmatier, Hamby & Jones

[57] ABSTRACT

For transferring data between a random access memory (RAM) and a rotating magnet memory on which the data are stored in tracks which can be addressed individually, the data are divided into blocks, each of which fits to one track of the magnetic memory, and each of the tracks of the magnetic memory is assigned to a different one of the data blocks. The addresses for the individual data in RAM are formed by adding the starting address indicating the beginning of the corresponding data block and the offset indicating the position of the individual data with regard to the starting address. The transfer of a data block starts at an address determined by the position of the magnetic memory when a transfer command occurs and it is performed by cyclically modifying the offset according to the number of storage locations belonging to one data block.

4 Claims, 2 Drawing Figures

TRANSFERRING DATA BETWEEN MEMORY AND MAGNETIC STORAGE

A device for executing this procedure includes a random access memory (RAM), a rotating magnetic memory, a data channel connecting the RAM with the magnetic memory and a central unit. The data channel comprises an addressing device, a word counter, a track register and a data counter, the track register being connected to the central unit and the data counter being connected to the magnetic memory. In operation, the track register is loaded with a word assigned to the track activated at the moment, whereas the data counter is adjusted to an initial value defined in each case at the beginning of a track and it is incremented by one at the beginning of every data word, the outputs of track register and data counter are connected to an addition network forming the address of RAM by means of the values transmitted.

The invention combines a device for transferring data blocks between a random access memory (RAM) and a rotating magnetic memory where the data are assigned on tracks which can be addressed individually.

The time required for transferring data to or from a rotating magnetic memory, especially a disk or magnetic drum, essentially depends on the access time to the individual storage locations of such a rotating magnetic memory. The access time is composed of the seek time required for positioning the read/write head of the device on the proper track followed by the latency time, which is the time required for the addressed location within the track to reach the read/write head. Even when read/write heads are assigned to every single track of the memory to avoid a mechanical positioning of the heads to the track for addressing a track, there will always be a latency time which in the most unfavourable case might be equal to the revolution time of a magnetic memory. In designing programs it is necessary to allow for such an unfavourable time in order to avoid any disturbances in program execution.

The invention is based on the procedure mentioned at the beginning which enables a considerable reduction of the latency time.

According to the invention, this task was solved by distributing the data into blocks each having the length of a track of the magnetic memory. Every data block is assigned to a track where the addresses for the individual data in the RAM are formed by the sum of the starting address defining the beginning of the current data block and by the shift indicating the position of the individual data in relation to the starting address. The transfer of a data block starts with the address specified by the position of the magnetic memory when a transfer command is given, and it is performed for the number of storage areas belonging to one data block, whereby the shift is changing cyclically.

The invention utilizes the fact that normally larger data quantities are exchanged between a magnetic memory and a RAM during the data transfer. For this reason, the data can be distributed into blocks assigned to the individual tracks of the magnetic memory. This assignment is used to start the data transfer at any position within the block and to guarantee—by counting the words of a block in connection with a relative addressing—that all words belonging to one block are transferred successively. First of all, all those words are transferred which follow the transfer start address present at the moment of calling. When the last address in a block is reached transfer continues by jumping to the block start address and sequentially transferring words until the original transfer start address is reached. In this way, the disturbing latency time can nearly be reduced to zero. In the case of commands to random access memories the current memory cycle has to be finished before access to an indicated address can be performed. This waiting time is comparable with that of the rotating magnetic memory, where it is the time between the memory call and the positioning of the beginning of the following data word, whose bits normally are arranged on the magnetic memory in series along the track.

For some purposes of application, it might be favourable to subdivide the individual data blocks into a number of sectors. In this case, the offset is formed by the starting address of a sector and by a number indicating the data position within the sector. The address at which the transfer of the data blocks is to be started is equal to the starting address of the next available sector after the transfer command has occurred. According to the invention, this performance provides that the gaps characterizing the position of the data need to be defined only for the beginning of each sector rather than each word. Thus, it is an optimum compromise between a maximum memory capacity and a minimum latency time.

The invention includes a device for executing the procedure described, including a data channel which connects the RAM with the magnetic memory, as well as an addressing device and a word counter. This data channel enables the direct transfer of a number of words defined by the contents of the word counter to or from the RAM locations characterized by the addressing device. The invention also provides for a central unit which determines the memory addresses before starting the transfer of data defined and which loads the word counter with the number of words to be transferred.

According to the invention, the device comprises not only the word counter, but also a track register and a data counter for executing the procedure described above. The track register is linked with the central unit and the data counter with the disk storage. The track register is loaded with a word corresponding to the track just activated, whereas the data counter is always adjusted to a fixed initial value at the beginning of a track and is then incremented by one at the beginning of every single data word. The outputs of the track register and the data counter are connected to an addition network which creates the appropriate RAM address from the contents of the two registers.

An essential advantage of the device is that a complete data block can be transferred independent of the central unit. The central unit only has to define the track of the magnetic memory from which or to which a data transfer is to be performed and to transmit the transfer command. Then, the whole data transfer is performed with a timing determined by the rate at which the rotating magnetic memory presents the individual data locations. The addresses of the RAM are created completely autonomously. When the word counter indicates that all words belonging the one data block have been transferred, the central unit will be informed that transfer is complete. If necessary, the central unit can now start the transfer of further data blocks.

For executing a procedure in which each data block is subdivided into a number of sectors, the data channel may also contain a sector counter adjusted to a defined initial value at the beginning of a track. This sector counter is incremented by one following each group of data words assigned to one sector. Its contents are added to the contents of the track register and to the data counter for determining the RAM address. At the beginning of each sector, the contents of the data counter are also adjusted to the initial value.

It is recommended to set to zero those initial values to which the sector counter and the data counter are adjusted, so that the track register is identical with the starting address of a data block in the RAM. Before starting a data transfer, the total number of the words to be transferred is loaded into the word counter. During transfer this counter is decremented, and the end of the data transfer is indicated when the counter has reached zero. If only blocks of the same length are transferred, it is possible to assign a register to the word counter from which a fixed initial value is inserted into the word counter before starting the data transfer. This means, that the activity of the central unit is limited to the transmission of a simple transfer command.

Below, this invention is described and explained in detail with the aid of an application example illustrated in FIGS. 1 and 2. The characteristics shown in the description and in the drawing can be used individually or in any combination for other applications of the invention.

Figure 2:
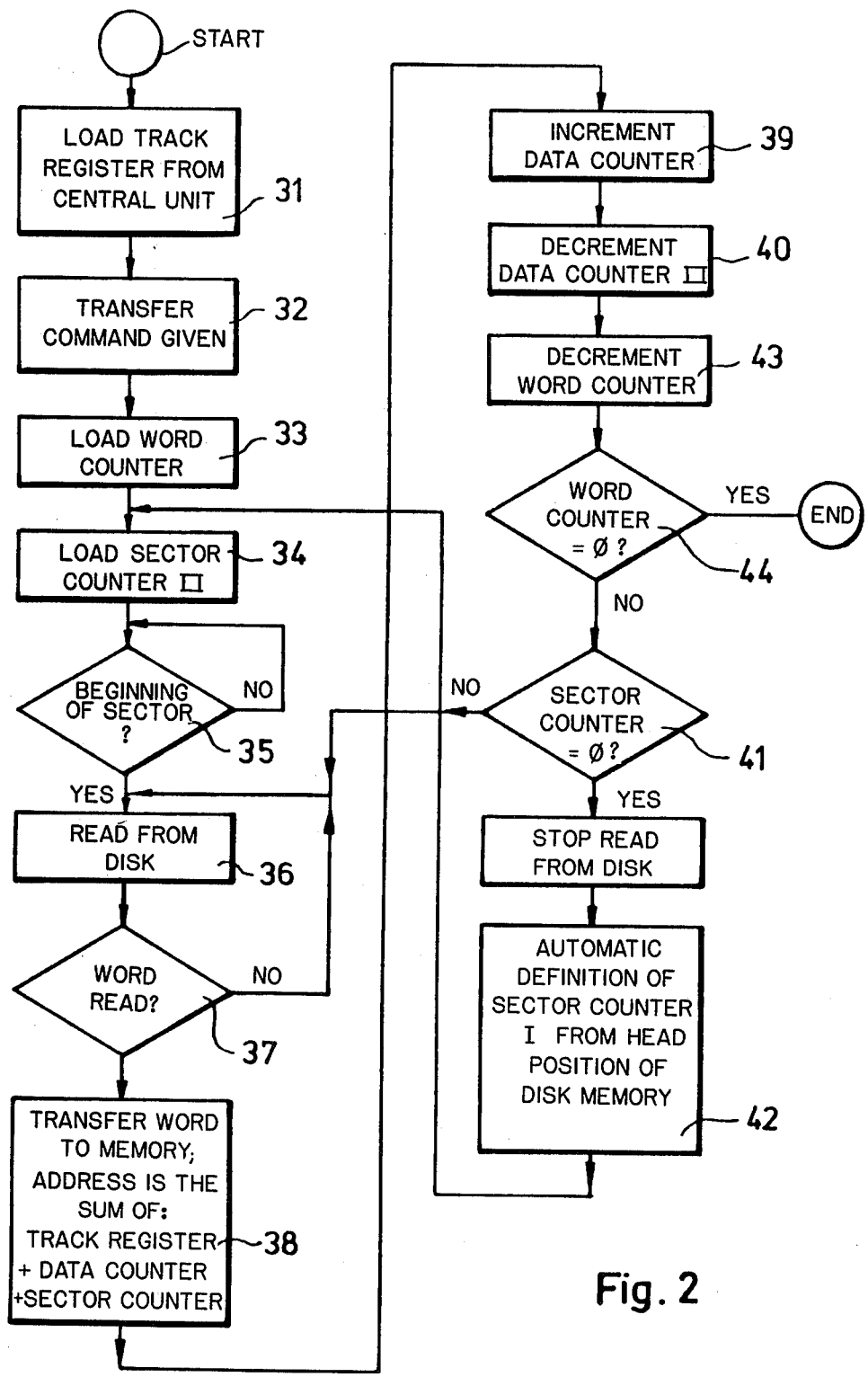

It is shown in:

FIG. 1 a schematic block diagram of a device for executing the procedure according to the invention FIG. 2 the flow chart of the procedure for the device realized according to FIG. 1

The device illustrated in FIG. 1 combines a disk storage 1 as rotating magnetic memory, a memory with random access (RAM 2) as well as a data channel 3 connecting these two memories which executes the data transfer from disk storage 1 to RAM 2 and vice versa, following commands delivered by the central unit 4. The transfer of the data quantities defined is performed by the data channel 3 without further influence of the central unit 4.

The data channel 3 contains an addressing matrix 11 to which the data are either transferred from disk storage 1 and further transferred to the appropriate RAM storage location defined by the address supplied to the addressing matrix 11 or the data are first transferred to the addressing matrix 11 from the appropriate RAM locations and then transferred to disk storage 1 with addresses specified by the activated track and the angular position of the storage medium at the moment of data transfer.

The data channel 3 contains a track register 12, a sector counter I 13, as well as a data counter 14 for creating an address. The outputs of these parts 12–14 are connected to an addition network 25 which forms the current address of memory 2 by adding the words contained in track register 12, sector counter I 13 and data counter 14. This current address is transmitted to the addressing matrix 11 from which or to which a data transfer is to be performed. Furthermore, the data channel 3 contains a word counter 15 connected with a block length register 16 and a sector counter II 17 connected with a sector length register 18. The disk storage 1 sends synchronization signals to the counters 15 and 17 in the word interval. According to the type of counter, these signals will increment or decrement the counter value by one. Furthermore, the disk storage 1 generates a resetting pulse at a position defining the beginning of a track. This pulse is given to sector counter I 13.

Before starting a data transfer procedure, the central unit 4 determines the track in disk storage 1 from which or to which the data are to be transferred. For this purpose, either the read/write head of the disk storage is positioned to the track defined or the read/write head assigned to the track selected is activated when the disk storage has fixed heads. When the track register 12 has been loaded with an address of memory (block 31) assigned to the track selected for the following data transfer, as shown in the flow chart of FIG. 2, then a transfer command (block 32) will start the transfer of the value contained in sector length register 18 to sector counter II 17, and the value contained in block length register 16 will be transferred to word counter 15 (block 33 and 34). If the assignment of the storage areas to the individual tracks has been fixed previously, it is possible to transfer an address assigned to the track selected from disk storage 1 to track register 12. It is evident that the same storage locations could be firmly assigned to a variety of different tracks. The block length register 16 contains the number of words which can be accommodated in a track of the disk storage or in a block of storage locations of memory 2. This word block is subdivided into a number of identical sectors, the sector length register contains the number of words assigned to one sector. This number is chosen so that a block comprises an integer number of sectors having the same length. The only procedure which requires the search and transfer of information by the central unit at the beginning of a data transfer is that of selecting the track of the disk storage. In all other procedures the transfer of fixed data is performed from special registers available for this purpose.

When the sector counter II 17 has reached the value zero after a transfer command was sent by the central unit 4 (block 32), i.e. a new sector must be started, the addressing matrix 11 allows data transfer from disk storage 1 to memory 2 or vice versa (block 35). Then, the data will be transferred to the addresses provided to the addressing matrix 11 resulting from the contents of track register 12, sector counter I 13 and data counter 14 (block 36 and 38 when data are transferred from disk storage to RAM). Here, the contents of track register 12 forms a basic address for the location in memory 2 of the data block which is to be transferred, whereas the sum resulting from the contents of sector counter I 13, indicating the current sector in disk storage 1, and from the contents of data counter 14, indicating the word location within the sector, forms an offset compared to the address contained in track register 12 which defines the corresponding data block storage area. The contents of data counter 14 is sequentially changed by means of the timing interval delivered by disk storage 1. In particular, it is incremented from zero, i.e. the current address of the storage location in memory 2 is incremented synchronously with the locations of disk storage 1 (block 39). Simultaneously, the contents to sector counter II 17 is changed, i.e. is decremented starting at the number characterizing the sector length (inserted at the beginning of a sector) and stopping when sector counter II 17 has reached zero (block 40,41). Then, the sector counter II 17 will generate a signal which resets the data counter 14 and increments the contents of sector counter I 13 (block 42). The sector register I may thus contain just the sector number, starting with zero, which is added to the contents of the track register and the word counter after shifting n places, provided that one sector contains $2^n$ words. This shift is equivalent to a multiplication of the sector number with the number of words contained in the sector. This shift, however, could also be realized by other methods. The signal generated by sector counter II 17 triggers the reloading of the number contained in sector length register 18 into sector counter II 17 (block 33) to enable the decrement to zero of this sector counter II 17 during the transfer of data contained in the following sector. When the track end is reached in this way, the data transfer will not be interrupted. The disk storage 1 simply delivers a resetting signal to sector counter I 13 to enable the transfer of data contained in the first sectors of the block to be transferred, if the data transfers was not started at the beginning of a block. The data transfer continues until the word counter 15 is decremented from the total number of words which are to be transferred within a block (inserted into word counter 15 from block length register 16) to zero. Then, this word counter informs the central unit that the data transfer (block 43,44) has ended.

After a transfer command occurs, it is obvious that the data transfer may be performed at the beginning of the following sector. Thus, it is not necessary to wait for access to the data standing at the beginning of the track. The method allows a significant reduction in the latency time of the disk storage. This time can be reduced to zero, when the content of the sectors is limited to one word, which is possible when the data are not processed in data sets assigned to the individual sectors, i.e. the data to be transferred cannot be processed until the whole block has been transferred. If the sector length is reduced to one word, the sector counters I and II, as well as the sector length register are not necessary.

What we claim is:

1. A method of transferring data blocks between a random access memory (RAM) and a rotating magnetic memory on which the data are stored in tracks which can be addressed individually, characterized by the fact that the data are divided into blocks, each of which fits to one track of the magnetic memory and such a track is assigned to each data block; the addresses for the individual data in RAM are formed by adding the starting address indicating the beginning of the corresponding data block and the offset indicating the position of the individual data with regard to the starting address; the transfer of a data block starts at an address determined by the position of the magnetic memory when a transfer command occurs and it is performed by cyclic change of the offset according to the number of storage locations belonging to one data block.

2. A method according to claim 1 characterized by the fact that each data block is subdivided into a number of sectors, that the offset is the sum of the starting address of a sector and the number indicating the position of data within the sector, and that the address at which the transfer of a data block starts is identical with the starting address of the next sector beginning after the occurrence of a transfer command.

3. Device for executing the method according to claim 1 or 2, with a random access memory (RAM); with an rotating magnetic memory on which the data are assigned in tracks which can be addressed individually; with a data channel connecting the RAM with the magnetic memory, and containing an addressing device and a word counter which causes the direct transfer of a number of words defined by the contents of the word counter to the locations in RAM characterized by the addressing device or vice versa; and with a central unit which determines the memory addresses before starting the transfer of the data defined and which loads the word counter with the number of words to be transferred, characterized by the fact that data channel (3) combines not only the word counter (15) but also a track register (12) and a data counter (14), whereby the track register (12) is linked with the central unit (4) and the data counter (14) with the magnetic memory (1), and the track register (12) is loaded with a word assigned to the track activated at the moment, whereas the data counter (14) is adjusted to an initial value defined in each case at the beginning of a track and it is incremented by one at the beginning of every data word, the outputs of track register (12) and data counter (14) are connected to an addition network (15) forming the address of RAM (2) by means of the values transmitted.

4. Device according to claim 3 characterized by the fact that the data channel (3) contains an additional sector counter (13), which is adjusted to an initial value defined at the beginning of a track, that it is incremented after every number of data words assigned to one sector and that its contents is added to the contents of the track register (12) and the data counter (14) for determining the RAM address, whereby the contents of the data counter are reset to the initial value at the beginning of every sector.

* * * * *